United States Patent
Kammara et al.

(10) Patent No.: US 12,225,062 B2
(45) Date of Patent: *Feb. 11, 2025

(54) UNINTERRUPTED VIRTUAL REALITY EXPERIENCE DURING CUSTOMER AND VIRTUAL AGENT INTERACTION

(71) Applicant: Bank of America Corporation, Charlotte, NC (US)

(72) Inventors: Sanjeeva Karna Kammara, Hyderabad (IN); Venkatrao Meenavalli, Hyderabad (IN); John Dinakar Iruvanti, Telegana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,478

(22) Filed: Sep. 25, 2023

(65) Prior Publication Data

US 2024/0305673 A1 Sep. 12, 2024

Related U.S. Application Data

(63) Continuation of application No. 18/119,452, filed on Mar. 9, 2023, now Pat. No. 11,799,920.

(51) Int. Cl.
| | |
|---|---|
| *G06F 15/16* | (2006.01) |
| *G06F 9/54* | (2006.01) |
| *H04L 29/06* | (2006.01) |
| *H04L 65/1069* | (2022.01) |
| *H04L 65/1083* | (2022.01) |

(52) U.S. Cl.
CPC ...... *H04L 65/1069* (2013.01); *H04L 65/1086* (2013.01)

(58) Field of Classification Search
CPC .................. H04L 65/1069; H04L 65/1086
USPC ............................................. 709/205
See application file for complete search history.

(56) References Cited

U.S. PATENT DOCUMENTS

| | | | | |
|---|---|---|---|---|
| 6,226,669 | B1 * | 5/2001 | Huang | G06F 3/011 |
| | | | | 709/227 |
| 7,539,127 | B1 * | 5/2009 | Shaffer | H04L 69/40 |
| | | | | 370/216 |
| 7,680,694 | B2 | 3/2010 | Glazer et al. | |
| 9,092,600 | B2 * | 7/2015 | Scavezze | H04L 63/08 |
| 9,349,118 | B2 | 5/2016 | Chavez | |
| 11,144,846 | B1 * | 10/2021 | Yannam | H04L 12/1818 |
| 11,379,806 | B2 * | 7/2022 | Licht | G06Q 20/367 |

(Continued)

*Primary Examiner* — Hamza N Algibhah
(74) *Attorney, Agent, or Firm* — Banner & Witcoff, Ltd.

(57) ABSTRACT

A real-time process for establishing and reestablishing virtual reality (VR) sessions between automated agent and a customer with customer VR equipment without losing session context after a connection loss is disclosed. VR sessions are dynamically created/recreated using artificial intelligence/machine learning (AI/ML) for engaging virtual agents and customers. Real-time capturing and processing of the VR interaction is captured for session context and stored via blockchain ledgers for secure tracking. VR session connectivity is monitored in real-time. If any anomaly or interruption occurs, retry notifications are sent to establish a second session. Prior session context is used for the second VR session to allow the virtual agent and customer interaction to continue without loss of context.

13 Claims, 8 Drawing Sheets

(56) References Cited

U.S. PATENT DOCUMENTS

| | | | | |
|---|---|---|---|---|
| 11,704,608 B2* | 7/2023 | Afzal | G06Q 50/40 705/7.15 |
| 12,067,898 B2* | 8/2024 | Yang | G06F 3/167 |
| 2007/0036334 A1* | 2/2007 | Culbertson | H04M 3/4938 379/266.01 |
| 2013/0311825 A1* | 11/2013 | Brunson | H04L 65/1096 714/16 |
| 2014/0201377 A1* | 7/2014 | Kadishay | H04L 65/1069 709/227 |
| 2014/0214629 A1* | 7/2014 | Azam | G06Q 30/0643 705/27.2 |
| 2016/0286597 A1* | 9/2016 | Eriksson | H04W 76/19 |
| 2017/0206708 A1* | 7/2017 | Gentilin | H04L 67/131 |
| 2017/0289221 A1* | 10/2017 | Khalid | H04L 65/764 |
| 2017/0330365 A1* | 11/2017 | Adamov | H04L 67/10 |
| 2017/0364920 A1* | 12/2017 | Anand | H04L 63/0861 |
| 2018/0150831 A1* | 5/2018 | Dolan | G06Q 20/321 |
| 2018/0152522 A1* | 5/2018 | White | H04L 67/148 |
| 2018/0157820 A1* | 6/2018 | Adams | G06F 3/017 |
| 2018/0204383 A1* | 7/2018 | Licht | G07F 9/006 |
| 2018/0213277 A1* | 7/2018 | Carney Landow | G06F 16/903 |
| 2019/0066198 A1 | 2/2019 | Keeler et al. | |
| 2019/0139318 A1 | 5/2019 | Tierney et al. | |
| 2019/0332400 A1* | 10/2019 | Spoor | G06F 3/013 |
| 2019/0374857 A1* | 12/2019 | Deller | G06T 13/40 |
| 2020/0065889 A1* | 2/2020 | Kline | G06F 3/167 |
| 2020/0067998 A1* | 2/2020 | Pilnock | A63F 13/77 |
| 2020/0328908 A1* | 10/2020 | Howland | H04L 67/131 |
| 2022/0076244 A1* | 3/2022 | Kannan | G06F 16/2379 |
| 2022/0103655 A1* | 3/2022 | Patnaikuni | H04L 43/0882 |
| 2022/0207818 A1* | 6/2022 | Allen | G09B 19/003 |
| 2022/0351281 A1* | 11/2022 | Morgan | H04L 51/02 |
| 2023/0055658 A1* | 2/2023 | Yao | H04L 69/40 |
| 2023/0239064 A1* | 7/2023 | Shepherd | H04J 3/0667 370/503 |
| 2023/0291740 A1* | 9/2023 | Ashby | G06Q 30/015 |
| 2023/0401948 A1* | 12/2023 | Engler | G06F 3/012 |
| 2024/0135830 A1* | 4/2024 | Rezajoo | G06F 3/011 |
| 2024/0139462 A1* | 5/2024 | Lal | A63F 13/79 |
| 2024/0187462 A1* | 6/2024 | Kavia | H04L 65/1043 |
| 2024/0214988 A1* | 6/2024 | Shrivastava | H04W 76/27 |
| 2024/0249345 A1* | 7/2024 | Tinklepaugh | G06Q 30/0643 |

* cited by examiner

UNINTERRUPTED VIRTUAL REALITY EXPERIENCE DURING CUSTOMER AND VIRTUAL AGENT INTERACTION

RELATED APPLICATIONS

This application is a continuation of U.S. patent application Ser. No. 18/119,452, filed Mar. 9, 2023. The entire contents of the aforementioned one or more applications are incorporated by reference in their entirety herein.

TECHNICAL FIELD

The present disclosure relates to electrical computers and digital processing systems and, more particularly, to machines and processes for dynamically creating/recreating virtual reality (VR) sessions between a VR customer-service agent utilizing artificial intelligence (AI)/machine learning (ML), to, inter alia, capture and monitor VR customer-service interactions and context, detect connection anomalies, and remedy and recreate sessions including prior context between the VR agent and customer in the event of disconnections while applying correct fixes based on prior learned session interactions.

DESCRIPTION OF THE RELATED ART

In all verbal and communications, "context" always matters. Something said in one context in one discussion may mean something else completely in a different context. In customer service interactions, context may include, inter alia, what has been said; by whom it was said; information or data that has been provided; questions that have been asked or answered; instructions that have been given; monitoring or sharing of a user's screen or photos/videos/images with customer service; demonstrations that have been shown; references that have been shared; troubleshooting that has taken place; processing to get the user to the right personnel or department who can help the user; order information, transaction information, product information, that is relevant to the interaction; pictures, screen shots, illustrations and the like that have been provided; the user's feelings, complaints, frustrations, or the like; the geographical location of the user and the particular regional influences and understandings of language in particular locales; the time, please, surroundings, circumstances, etc. of the issue; requests that have been made; and responses that have been provided, etc. These are just a few non-limiting examples provided to help understand the context of this disclosure. The bottom line is that "context" can include many things and context always matters, especially in customer service interactions.

For any conversation between a virtual customer-support agent (e.g., AI-based bot) and a customer via virtual reality (VR) over the Internet, continuing with the same context after a connection loss or session interruption is a frustrating experience for the customer and presents technical problems for the support company. As much context as possible needs to be captured, retained, and utilized.

While having a customer interaction with a support agent over VR, deciding on a suitable context and maintaining it throughout the conversation journey, from customer problem identification to resolution, is challenging.

If there is an interruption in the connection or a problem with the interaction, customers often start a "new" or additional support session. This can lead to new conversations that lack the prior "context" of the previous AI interaction including failing to account for all of the information previously provided by the virtual agent to the customer and all of the information received from the customer. Hence, for any new or additional session, the customer and AI bot are often repeating themselves, describing the problems or issues yet again, progressing through the same troubleshooting steps again, providing the same information over and over, providing the same responses over and over, etc. This is a disruptive and frustrating experience.

Prior art VR systems are unable to track VR conversations in order to continue them in a later conversation in the same "context" in the event of a connectivity problem or session interruption.

Prior art VR systems are also unable to identify and restore connection failures. Further, VR prior art systems are unable to process extremely large amounts of VR/ML/AI data in order to select and report the suitable context in which to continue sessions and interactions. There is no methodology derived so far to restore failures by maintaining previous session context in VR interactions. Existing processes require manual effort to analyze failed transactions and take appropriate action which also leads to poor customer experience in terms of transaction processing and turn around period.

Hence there is a long felt and unsatisfied need to provide improved VR customer-service interactions, AI/ML context monitoring, service interruption handling, AI/ML session creation/recreation in context, and other related solutions in order to identify anomalies and correct them to provide uninterrupted and seamless service to the customers.

SUMMARY OF THE INVENTION

In accordance with one or more arrangements of the non-limiting sample disclosures contained herein, solutions are provided to address one or more of the shortcomings in the field of VR/AI/ML remote customer-support interactions by, inter alia: (a) creating/recreating sessions using AI/ML for engaging virtual agents and customers; (b) real-time capturing of VR journey and processing (including encoding or decoding of audio/video/messages) and storing sessions; (c) real-time monitoring of VR session connectivity; and (d) if any anomaly happens, AI agent applying the correct fix based on past learnt session interactions and dynamic session generations/regenerations if any anomaly is encountered.

The foregoing can be implemented as a self-correction layer in a VR model or system. The service has the ability to restore sessions from failure by recreating them based on learnt experiences using AI/ML models. This provides a pluggable solution and that can be integrated with any other VR applications. It can also be implemented as separate servers, on separate machines, in neural nets, or the functionality can be distributed.

Primary technical components can include, inter alia, (a) a requests handler: a platform independent system used for handling virtual reality requests); (b) a tracking system: a conversation tracking system that maintains the ledger details using blockchain technology; (c) a data store: auto scalable and high-performance storage platform to maintain media and text information; (d) adaptive bitrate system: to improve video/audio quality and able to transmit and receive multimedia; (e) artificial intelligence and machine learning (AI/ML) processing (preferably as part of a neural net): AI/ML techniques are utilized to self-learn, interpret, and detect appropriate context which to continue, and to identify anomalies in the system and provide input to an automatic alerting system; and (f) robotics: provide automatic alerting system and remediate the issues identified in the system.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a real-time process for establishing and reestablishing virtual reality (VR) sessions between an automated agent and a customer with customer VR equipment without losing session context after a connection loss can include one or more steps, such as, for example: providing, by a VR server, a virtual agent; creating, by the VR server in response to a customer request received from the customer VR equipment, a first VR session between the customer and the virtual agent; capturing, by the VR server, an encrypted VR interaction between the customer VR equipment and the virtual agent during the first VR session; storing, by the VR server in a data store, the encrypted VR interaction with a conversation tracker blockchain; monitoring and processing, by the VR server, the encrypted interaction to identify a context for the first VR session; storing, by the VR server in the data store, the context with the conversation tracker blockchain; monitoring, by the VR server, the first VR session to detect any connection interruption; if a connection interruption is detected: generating, by the VR server, a retry notification; transmitting, by the VR server, a retry notification to the customer VR equipment; receiving, by the VR server from the customer in response to the retry notification, a reconnection request; retrieving, by the VR server from the data store, the context for the first VR session; and creating, by the VR server, a second VR session using the context so that the virtual agent and the customer may continue with the second VR session in an uninterrupted manner without loss of context from the first VR session.

In some arrangements, a real-time process for establishing and reestablishing virtual reality (VR) sessions between an automated agent and a customer with customer VR equipment without losing session context after a connection loss can include one or more steps, such as, for example: providing, by a VR server, a virtual agent implemented using virtual-agent artificial intelligence (AI); creating, by the VR server in response to a customer request received from the customer VR equipment, a first VR session between the customer and the virtual agent using session machine learning (ML); capturing, by a monitoring/rectification system using monitoring/rectification AI, an encrypted VR interaction between the customer VR equipment and the virtual agent during the first VR session; storing, by the monitoring/rectification system in a data store, the encrypted VR interaction with a conversation tracker blockchain that maintains a ledger of the first VR session; monitoring and processing, by the monitoring/rectification system, the encrypted interaction to identify a context for the first VR session; storing, by the monitoring/rectification system in the data store, the context with the conversation tracker blockchain; monitoring, by the monitoring/rectification system using said monitoring and rectification AI, the first VR session to detect any connection interruption; if a connection interruption is detected: generating, by the monitoring/rectification system, an IoT retry notification; transmitting, by the monitoring/rectification system, the IoT retry notification to the customer VR equipment and to the VR server; receiving, by the VR server from the customer in response to the IoT retry notification, a reconnection request; retrieving, by the VR server from the monitoring/rectification system, the context for the first VR session; and creating, by the VR server, a second VR session using the context from the monitoring/rectification system, so that the virtual agent and the customer may continue with the second VR session in an uninterrupted manner without loss of context from the first VR session.

In some arrangements, a real-time process for establishing and reestablishing virtual reality (VR) sessions between an automated agent and a customer with customer VR equipment without losing session context after a connection loss can include one or more steps, such as, for example: providing, by a VR server in a neural net, a virtual agent implemented using virtual-agent artificial intelligence (AI); creating, by a VR conversation initiator in the VR server in response to a customer request received from the customer VR equipment, a first VR session between the customer and the virtual agent using session machine learning (ML); capturing, by a monitoring/rectification layer in the VR server, an encrypted VR interaction between the customer VR equipment and the virtual agent during the first VR session using monitoring/rectification AI; storing, by the monitoring/rectification layer in a data store, the encrypted VR interaction with a conversation tracker blockchain that maintains a ledger of the first VR session; monitoring and processing, by the monitoring/rectification layer, the encrypted interaction to identify a context for the first VR session; storing, by the monitoring/rectification layer in the data store, the context with the conversation tracker blockchain; monitoring, by the monitoring/rectification layer using the monitoring/rectification AI, the first VR session to detect any connection interruption; if a connection interruption is detected: generating, by the monitoring/rectification layer, an IoT retry notification; transmitting, by the monitoring/rectification layer, the IoT retry notification to the customer VR equipment and to the VR server; receiving, by the VR server from the customer in response to the IoT retry notification, a reconnection request; retrieving, by the VR server from the monitoring/rectification layer, the context for the first VR session; and creating, by the VR conversation initiator in the VR server, a second VR session using the context from the monitoring/rectification layer, so that the virtual agent and the customer may continue with the second VR session in an uninterrupted manner without loss of context from the first VR session.

In some arrangements, one or more various steps of processes disclosed herein can be implemented in whole or in part as computer-executable instructions stored on computer-readable media. Functionality and steps can be performed on a machine or distributed across a plurality of machines that are in communication with one another.

The foregoing and other aspects of this disclosure described herein enable creation/recreation of sessions based on previously created sessions using AI/ML and engagement of another virtual agent with the same context whenever connections are dropped, or sessions are interrupted.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
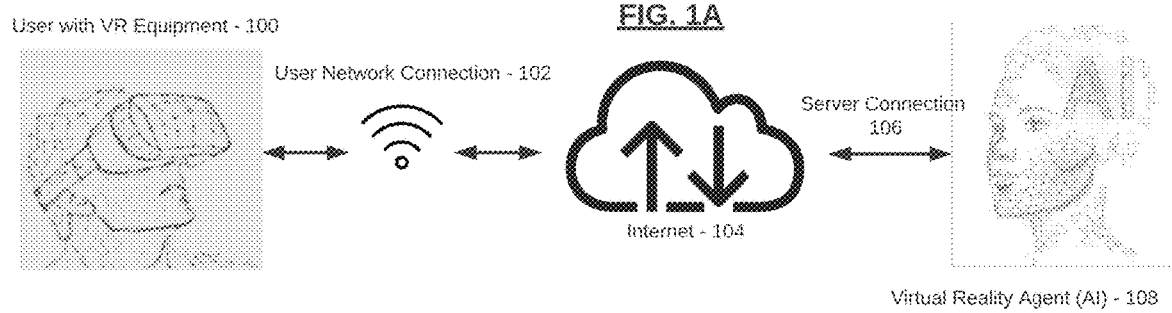
FIGS. 1A-1D depict sample virtual agent and customer VR sessions including the creation of sessions, session interruptions, and reestablishment of sessions in accordance with one or more aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, neural nets, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more neural networks, local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIGS. 1A-1D depict sample virtual agent and customer VR sessions including the creation of sessions, session interruptions, and reestablishment of sessions in accordance with one or more aspects of this disclosure.

In FIG. 1A, users or customers with virtual reality (VR) equipment 100, such as a VR headset coupled to a local user computer, are able to connect over their local network connection 102 through the Internet 104 via a secure encrypted connection 106 to a virtual agent or automated bot 108. The virtual agent can appear as a virtual reality (VR) person or another object as desired. This is the situation when a session is created, and the interaction is able to be conducted normally without any interruption.

Figure 1B:
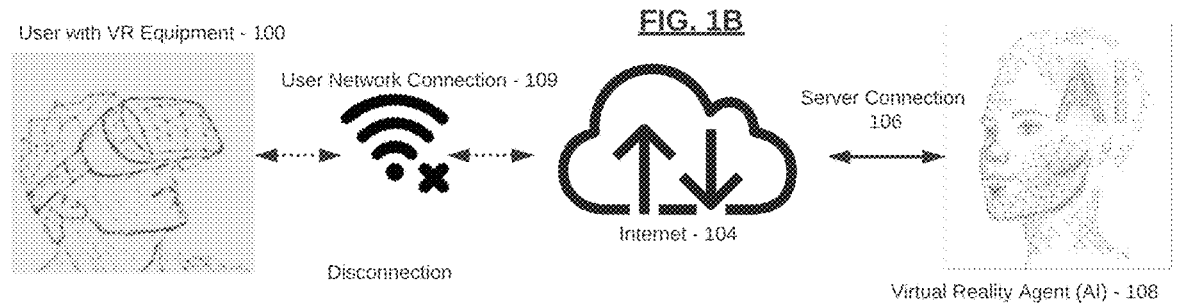

In FIG. 1B, the situation is the same as in FIG. 1A; however, there is a loss of connectivity or other disruption 109 on the user's premises that results in anomalous termination of the session without resolution of the outstanding issues. This could happen, for example, if there is a Wi-Fi problem at the user's premises.

Figure 1C:
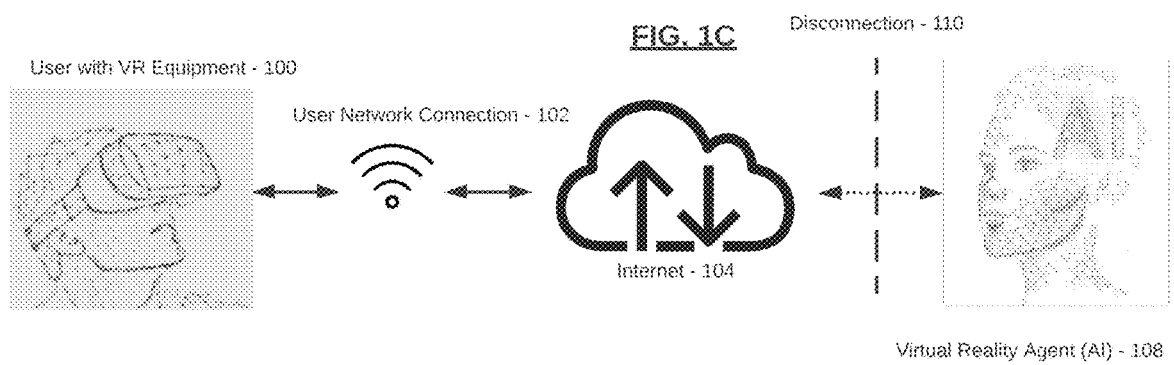

In FIG. 1C, the situation is the same as in FIG. 1A; however, there is a loss of connectivity or other disruption 110 on the enterprise side of the connection that results in anomalous termination of the session without resolution of the outstanding issues. This could happen, for example, if there was a data center outage that disrupted enterprise connectivity.

Figure 1D:
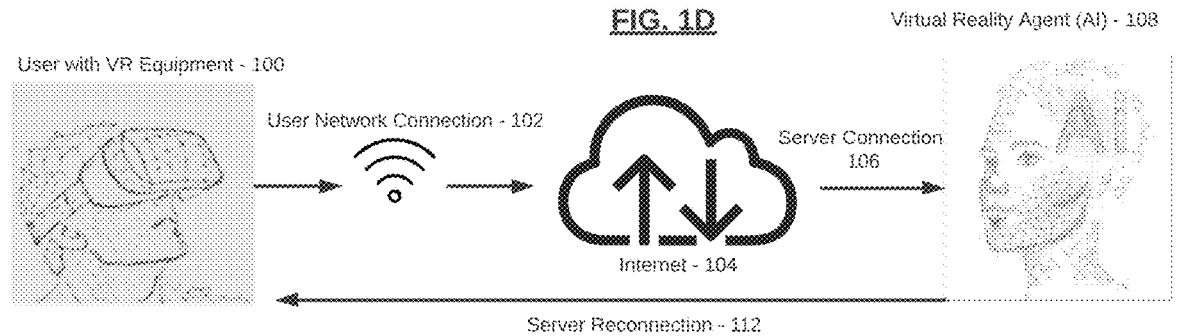

In either FIG. 1B or the situation of FIG. 1C, the session connection is lost, and the user's issues have not been resolved. Hence there is a need to reestablish the connection and continue efforts to resolve the user's problems or issues. This is what is depicted in FIG. 1D. In the event of a disruption or loss of connection 109, 110, the system of this disclosure can attempt automatically to reinitiate contact 112 to reconnect the server to the user and the user's VR equipment in order to recreate the session without interruption or loss of context for the VR interaction.

Figure 2:
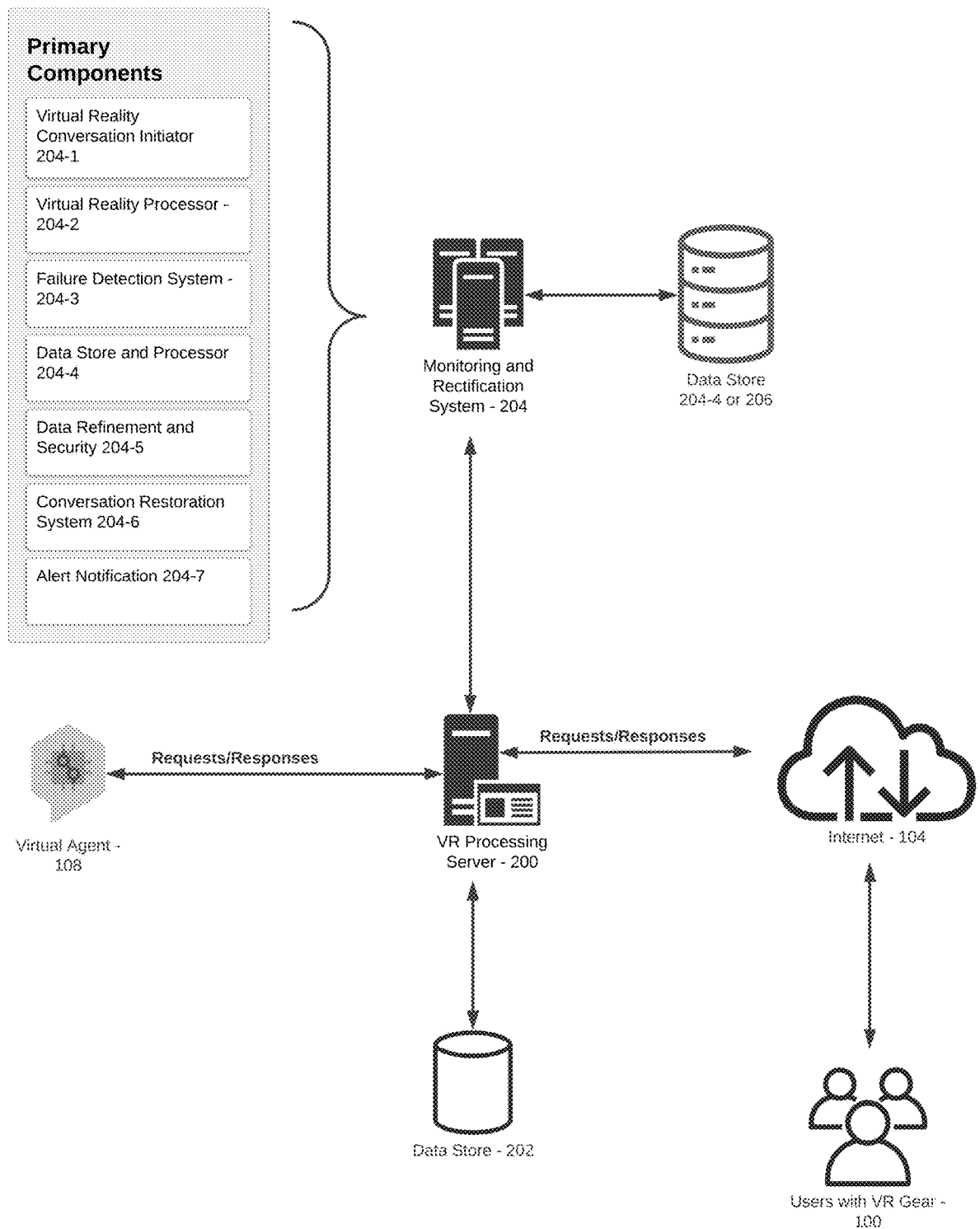
FIG. 2 depicts a sample, functional, flow diagram showing example functions, components, and potential architectures for providing an uninterrupted VR experience during customer and virtual agent sessions in accordance with one or more aspects of this disclosure.

By way of non-limiting disclosure, FIG. 2 depicts a sample functional flow diagram showing example functions, components, and potential architectures for providing an uninterrupted VR experience during customer and virtual agent sessions in accordance with one or more aspects of this disclosure.

A virtual reality (VR) process server 200 can be coupled to a data store 202 and a monitoring and rectification system 204, which can also be coupled to internal data store 204-4 or external data store 206. The VR processing server 200 can process and handle requests and responses sent from users with VR gear 100 through the Internet 104 to virtual agent 108. The virtual agent 108 can be implemented using artificial intelligence.

Monitoring and rectification system 204 can be a stand-alone system or can be configured to operate as a layer in the VR processing server 200. It could also be implemented as part of a multicomputer system or neural net. Primary components of the monitoring and rectification system 204 can include: a virtual reality conversation initiator 204-1, a virtual reality processor 204-2, a failure detection system or component 204-3, an internal data store and processor 204-4, data refinement and security functionality 204-5, conversation restoration system or function 204-6, and alert notification 204-7.

Virtual reality conversation initiator 204-1 can create virtual agent and customer sessions as well as recreate them, without losing context observed during the original session, in the event of a loss of connection. Virtual reality processor or processing functionality 204-2 can handle processing of requests and generation of responses. It can also continuously monitor, process, and capture the session interaction, which can then be stored internally or externally in data store 204-4 or 206. This ensures that the interaction is captured in real-time and is processed in real-time to determine the context of the interaction. Data can be refined or normalized as part of processing or separately in 204-5 and can be secured during transmission/receipt of requests/responses by encryption and can further be secured and kept track of by use of blockchain technology.

As part of the monitoring process, a failure detection system or component 204-3 can detect a loss of connectivity or interruption of the session. If a loss is detected, the conversation restoration system 204-6 can restore the session, based on the processed and saved information from the original session, with context and all prior interactions, so that the customer experience can continue without interruption. An alert notification system or component 204-7 can generate a message for the user to alert the user that the connection has been interrupted and provide a link or other mechanism to enable the user to reestablish the connection and resume from where it was left off. The alert could be a message transmitted directly to the user's VR gear, an email to the user, or a text message to the user's phone, tablet, or the like, etc.

Figure 3:
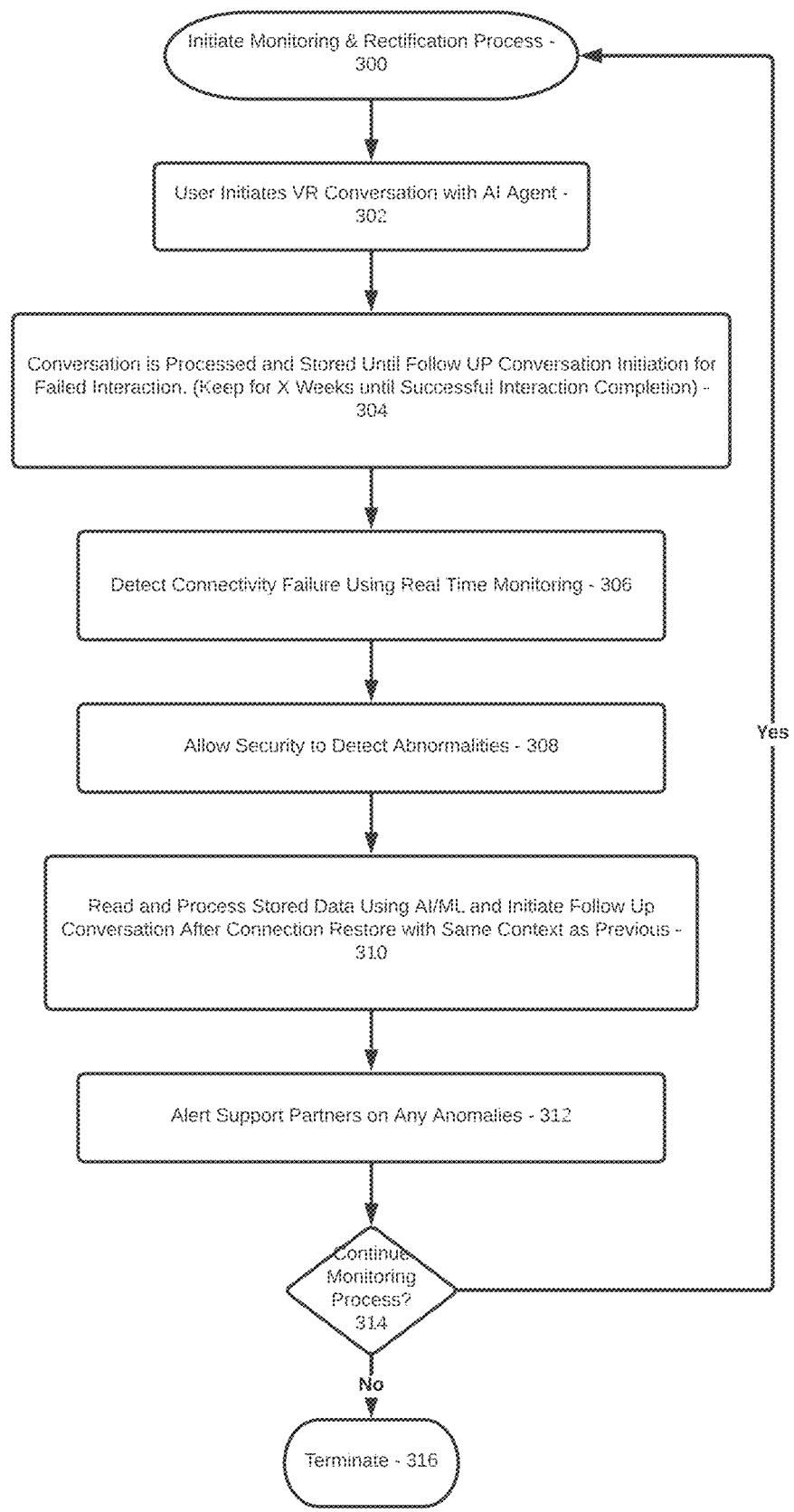
FIG. 3 depicts a sample, functional, flow diagram showing various aspects for providing an uninterrupted VR experience during customer and virtual agent sessions in accordance with one or more aspects of this disclosure.

By way of non-limiting disclosure, FIG. 3 depicts a sample flow diagram showing various aspects for providing an uninterrupted VR experience during customer and virtual agent sessions in accordance with one or more aspects of this disclosure.

In 300, a monitoring & rectification process can be initiated. A user can initiate a VR conversation with an artificial intelligence (AI) agent or bot in 302.

In 304, the conversation is processed and stored until follow up conversation(s) are initiated for failed interaction(s). These may be kept for a certain number of weeks or other period of time until a success interaction is completed. After expiration of a relevant period of time or after a successful session is concluded, they may be deleted if desired.

In 306, any connectivity failure can be observed using real-time monitoring. If detected, security can be allowed to correct the issue and/or review the events leading up to the issue in 308.

In 310, stored data can be read and processed using AI and/or ML and a follow up session or conversation can be initiated after connection restoration and the same context can be automatically utilized and applied.

In 312, support partners as well as the customer can be alerted to any anomalies or connection interruptions.

In 314, this can continue, as needed, until the session or interaction is concluded normally in 316.

Figure 4:
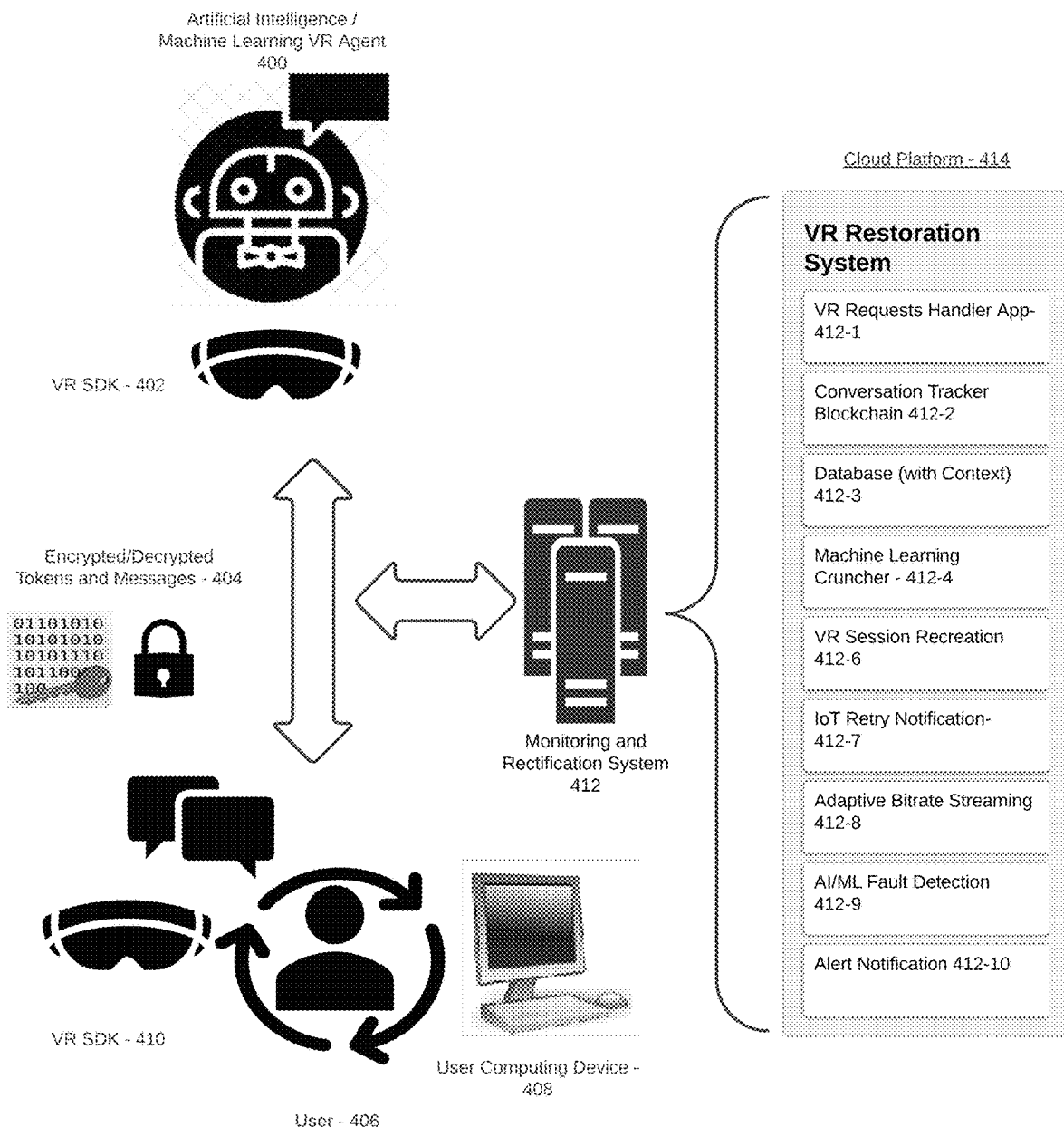
FIG. 4 depicts a sample, functional, flow diagram showing example functions, components, and potential architectures for providing an uninterrupted VR experience during customer and virtual agent sessions in accordance with one or more aspects of this disclosure.

By way of non-limiting disclosure, FIG. 4 depicts a sample functional flow diagram showing example functions, components, and potential architectures for providing an uninterrupted VR experience during customer and virtual agent sessions in accordance with one or more aspects of this disclosure.

An AI/ML VR agent 400 is able to interact in VR based on a server-side VR software development kit (SDK) 402. Tokens and messages can be encrypted and transmitted, and thereafter received and decrypted on both sides of the VR connection 404 in a bidirectional manner. Received messages can be processed by the user-side VR SDK 410 that is implemented between the VR SDK 410 and the user computing device 408, thereby enabling the user 406 to participate in the VR session with the AI/ML VR virtual agent or bot 400.

The monitoring and rectification system 412 may be cloud based 414, integrated as part of a network layer, implemented as a self-rectification layer in a VR server or as part of a neural net. The VR restoration system can include: a VR requests handler app 412-1, conversation tracker blockchain 412-2, a database or data store (that stores context and other session information) 412-3, machine learning cruncher 412-4, a VR session recreation module 412-6, an Internet of Things (IoT) retry notification or other similar module 412-7, an adaptive bitrate streaming module 412-8, an AI/ML fault detection module 412-9, and an alert notification module 412-10.

The requests handler can be a platform independent system used for handling virtual reality requests. The tracking system can be a conversation tracking system that maintains the ledger details using blockchain technology. The data stores referenced herein can be auto scalable and a high-performance storage platform to maintain media and text information. The adaptive bitrate system can be utilized to improve video/audio quality and to be able to transmit and receive multimedia. The AI/ML techniques referenced herein can be highly used to self-learn, interpret, and detect appropriate context with which to continue and can identify anomalies in the system and provide input to an automatic alerting system. Robotics can be used to provide an automatic alerting system and remediate the issues identified in the system.

By way of non-limiting disclosure, FIGS. 5-8 depict sample flow diagrams showing various aspects and potential implementations for providing an uninterrupted VR experience during customer and virtual agent sessions.

Figure 5:
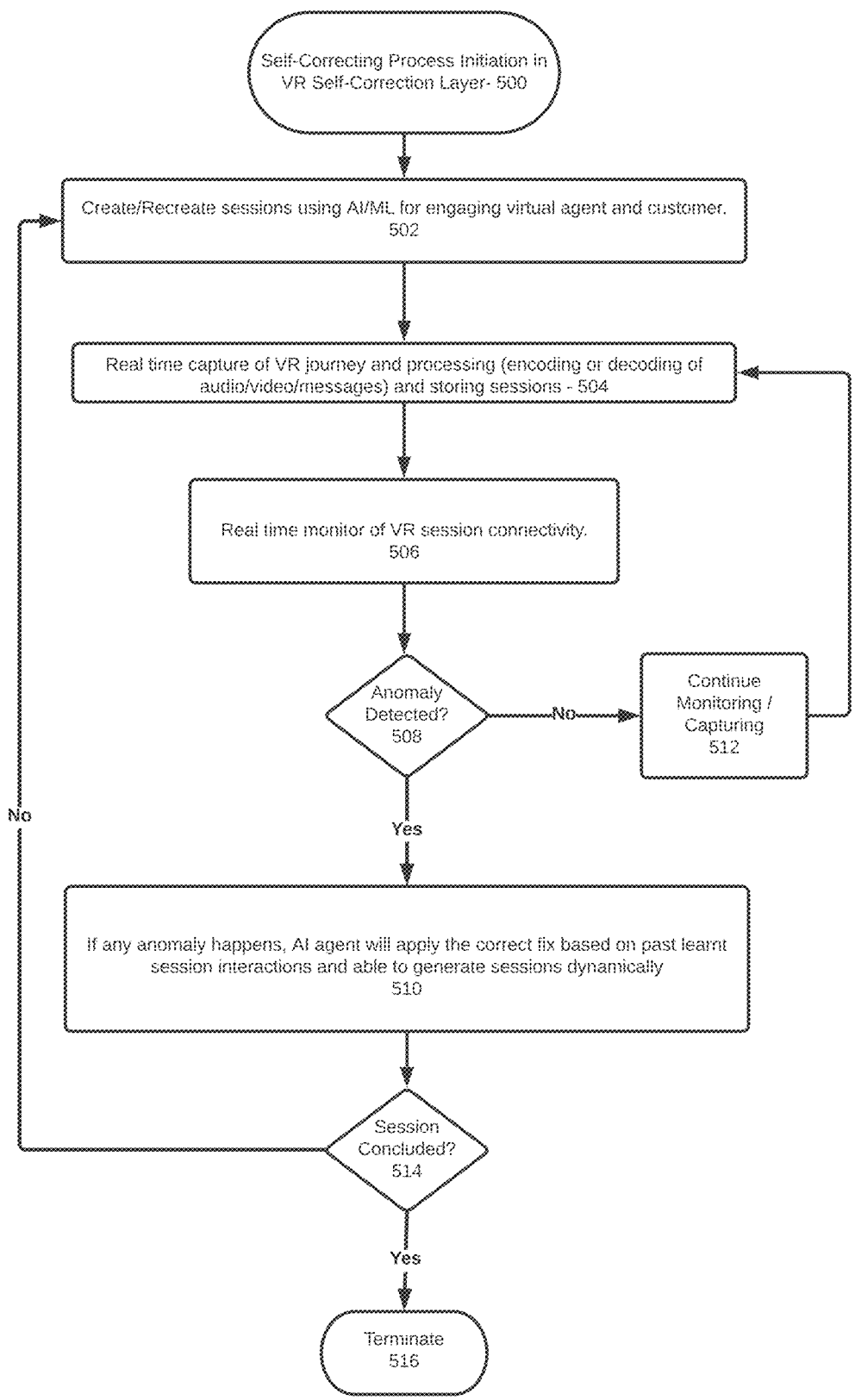
FIGS. 5-8 depict sample flow diagrams showing various aspects and potential implementations for providing an uninterrupted VR experience during customer and virtual agent sessions.

In FIG. 5, a self-correcting process can be initiate in a VR self-correction layer in 500. Sessions can be created/recreated using AI/ML for engaging virtual agent and customer with one another in virtual reality in 502.

In 504, the VR journey can be captured in real-time and processed (including encoding or decoding of audio/video/messages) and storing sessions.

In 506, real-time monitoring of VR session connectivity can be performed. As long as an anomaly is not detected 508, the monitoring/capturing/processing, etc. can continue in 512. If any anomaly happens, an AI agent can apply the correct fix based on past learnt session interactions and generate recreated sessions dynamically in 510.

This process can continue until the session is concluded in 514 and the overall session terminates 516 successfully.

Figure 6:
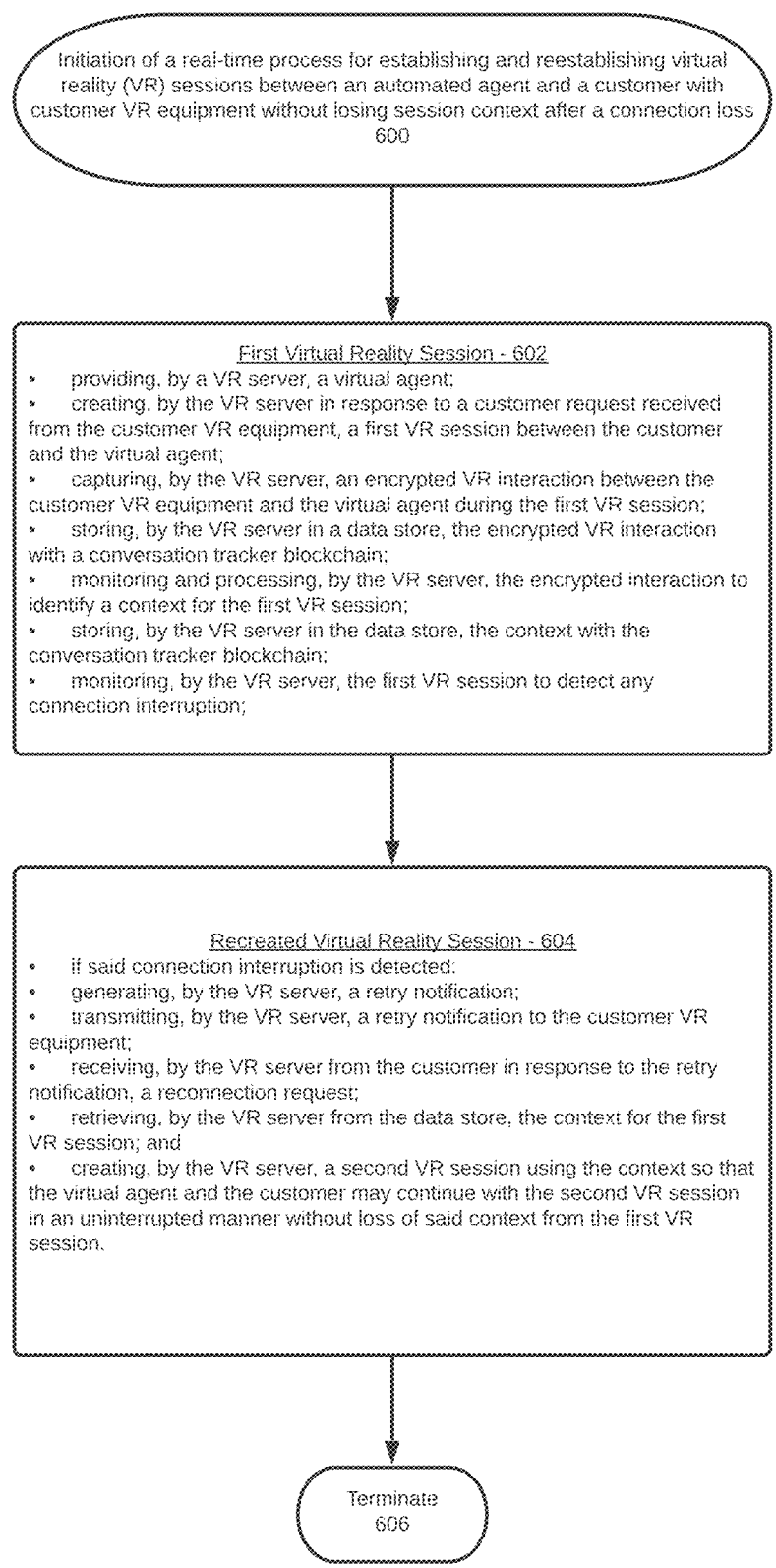

In FIG. 6, a real-time process for establishing and reestablishing virtual reality (VR) sessions between an automated agent and a customer with customer VR equipment without losing session context after a connection loss is initiated in 600. Process steps in a first virtual reality session between a virtual agent and a VR user in 602 can include: providing, by a VR server, a virtual agent; creating, by the VR server in response to a customer request received from the customer VR equipment, a first VR session between the customer and the virtual agent; capturing, by the VR server, an encrypted VR interaction between the customer VR equipment and the virtual agent during the first VR session; storing, by the VR server in a data store, the encrypted VR interaction with a conversation tracker blockchain; monitoring and processing, by the VR server, the encrypted interaction to identify a context for the first VR session; storing, by the VR server in the data store, the context with the conversation tracker blockchain; and monitoring, by the VR server, the first VR session to detect any connection interruption.

In 604, the VR session can be recreated and reestablished if a connection interruption is detected. This can include: generating, by the VR server, a retry notification; transmitting, by the VR server, a retry notification to the customer VR equipment; receiving, by the VR server from the customer in response to the retry notification, a reconnection request; retrieving, by the VR server from the data store, the context for the first VR session; and creating, by the VR server, a second VR session using the context so that the virtual agent and the customer may continue with the second VR session in an uninterrupted manner without loss of context from the first VR session.

Figure 7:
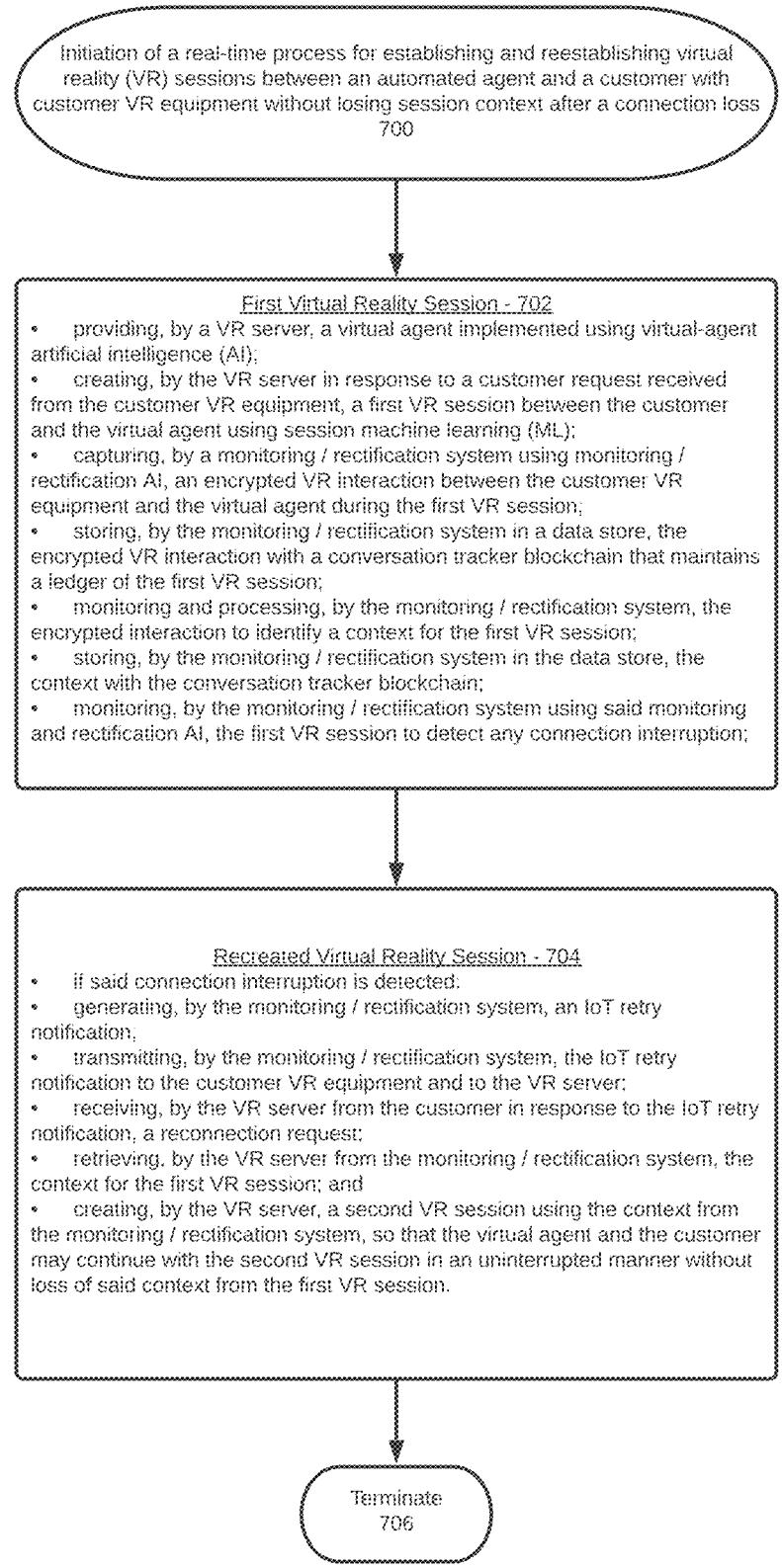

In FIG. 7, a real-time process for establishing and reestablishing virtual reality (VR) sessions between an automated agent and a customer with customer VR equipment without losing session context after a connection loss is initiated in 700. Process steps in a first virtual reality session between a virtual agent and a VR user in 702 can include: providing, by a VR server, a virtual agent implemented using virtual-agent artificial intelligence (AI); creating, by the VR server in response to a customer request received from the customer VR equipment, a first VR session between the customer and the virtual agent using session machine learning (ML); capturing, by a monitoring/rectification system using monitoring/rectification AI, an encrypted VR interaction between the customer VR equipment and the virtual agent during the first VR session; storing, by the monitoring/rectification system in a data store, the encrypted VR interaction with a conversation tracker blockchain that maintains a ledger of the first VR session; monitoring and processing, by the monitoring/rectification system, the encrypted interaction to identify a context for the first VR session; storing, by the monitoring/rectification system in the data store, the context with the conversation tracker blockchain; and monitoring, by the monitoring/rectification system using said monitoring and rectification AI, the first VR session to detect any connection interruption.

In 704, the VR session can be recreated and reestablished if a connection interruption is detected. This can include: generating, by the monitoring/rectification system, an IoT retry notification; transmitting, by the monitoring/rectification system, the IoT retry notification to the customer VR equipment and to the VR server; receiving, by the VR server from the customer in response to the IoT retry notification, a reconnection request; retrieving, by the VR server from the monitoring/rectification system, the context for the first VR session; and creating, by the VR server, a second VR session using the context from the monitoring/rectification system, so that the virtual agent and the customer may continue with the second VR session in an uninterrupted manner without loss of context from the first VR session.

Figure 8:
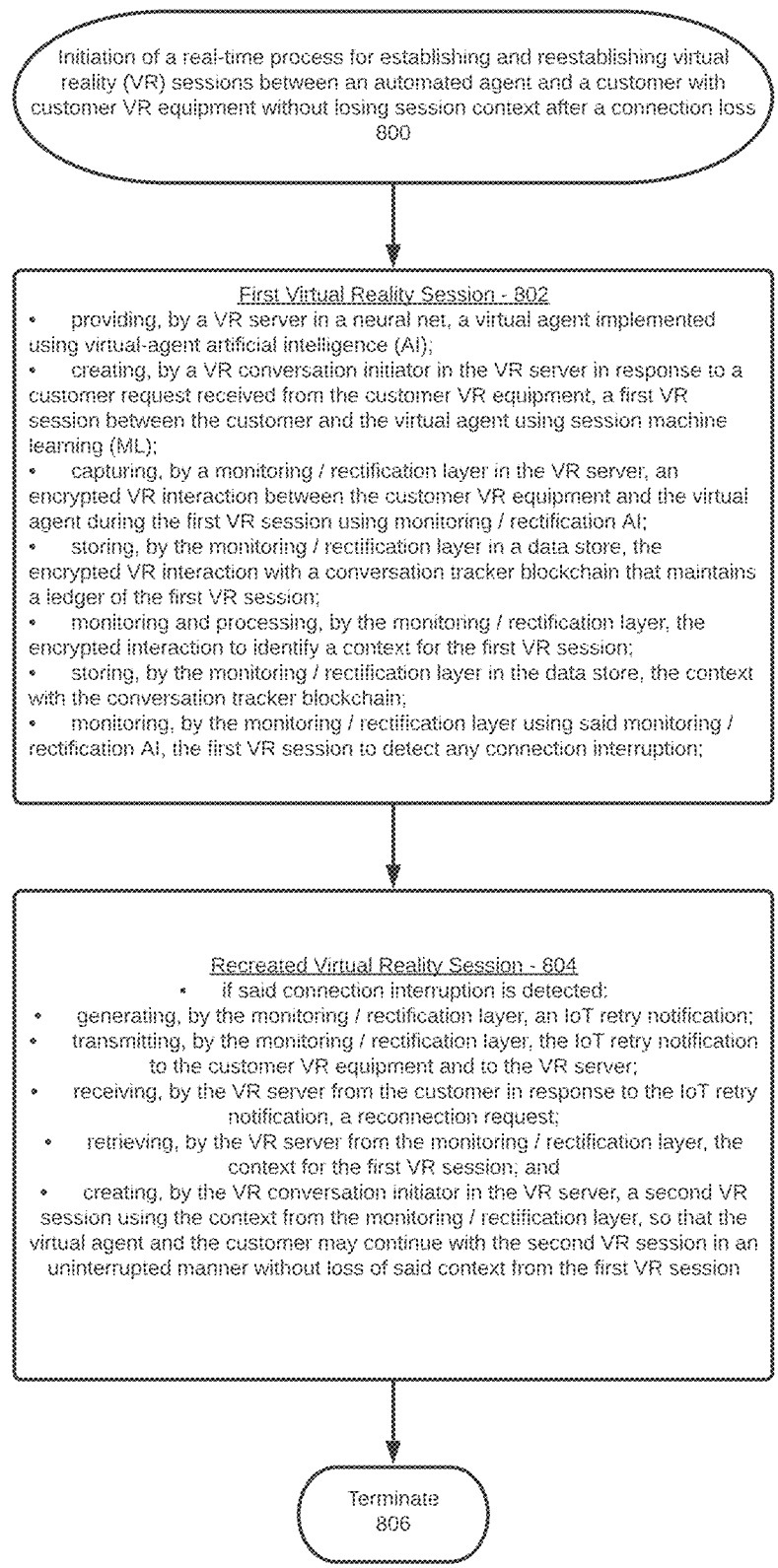

In FIG. 8, a real-time process for establishing and reestablishing virtual reality (VR) sessions between an automated agent and a customer with customer VR equipment without losing session context after a connection loss is initiated in 800. Process steps in a first virtual reality session between a virtual agent and a VR user in 802 can include: providing, by a VR server in a neural net, a virtual agent implemented using virtual-agent artificial intelligence (AI); creating, by a VR conversation initiator in the VR server in response to a customer request received from the customer VR equipment, a first VR session between the customer and the virtual agent using session machine learning (ML); capturing, by a monitoring/rectification layer in the VR server, an encrypted VR interaction between the customer VR equipment and the virtual agent during the first VR session using monitoring/rectification AI; storing, by the monitoring/rectification layer in a data store, the encrypted VR interaction with a conversation tracker blockchain that maintains a ledger of the first VR session; monitoring and processing, by the monitoring/rectification layer, the encrypted interaction to identify a context for the first VR session; storing, by the monitoring/rectification layer in the data store, the context with the conversation tracker blockchain; and monitoring, by the monitoring/rectification layer using said monitoring/rectification AI, the first VR session to detect any connection interruption.

In 804, the VR session can be recreated and reestablished if a connection interruption is detected. This can include: generating, by the monitoring/rectification layer, an IoT retry notification; transmitting, by the monitoring/rectification layer, the IoT retry notification to the customer VR equipment and to the VR server; receiving, by the VR server from the customer in response to the IoT retry notification, a reconnection request; retrieving, by the VR server from the monitoring/rectification layer, the context for the first VR session; and creating, by the VR conversation initiator in the VR server, a second VR session using the context from the monitoring/rectification layer, so that the virtual agent and the customer may continue with the second VR session in an uninterrupted manner without loss of context from the first VR session.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A real-time process for establishing and reestablishing virtual reality (VR) sessions between an automated agent and a customer with customer VR equipment without losing session context after a connection loss comprising the steps of:
   providing, by a VR server, a virtual agent, said virtual agent implemented using virtual-agent artificial intelligence (AI);
   creating, by the VR server in response to a customer request received from the customer VR equipment, a first VR session between the customer and the virtual agent, the first VR session created using session machine learning (ML);
   capturing, by the VR server, an encrypted VR interaction between the customer VR equipment and the virtual agent during the first VR session;
   storing, by the VR server in a data store, the encrypted VR interaction with a conversation tracker;
   monitoring and processing, by the VR server, the encrypted interaction to identify a context for the first VR session;
   storing, by the VR server in the data store, the context with the conversation tracker;
   monitoring, by the VR server using monitoring ML, the first VR session to detect any connection interruption; and
   creating, by the VR server, a second VR session using the context and the conversation tracker so that the virtual agent and the customer may continue with the second VR session in an uninterrupted manner without loss of said context from the first VR session,
   wherein the VR server includes a VR conversation initiator in order to create the first VR session and the second VR session, and the VR server includes a VR processor for processing the encrypted VR interaction, and
   wherein, if said connection interruption is detected: the VR server generates a retry notification and transmits the retry notification to the customer VR equipment, the VR server receives a reconnection request from the customer in response to the retry notification, and the VR server retrieves from the data store the context for the first VR session.

2. The real-time process for establishing and reestablishing virtual reality (VR) sessions of claim 1 in which a retry notification is sent from the VR server to the customer via text message.

3. The real-time process for establishing and reestablishing virtual reality (VR) sessions of claim 1 in which a retry notification is sent from the VR server to the customer via email.

4. The real-time process for establishing and reestablishing virtual reality (VR) sessions of claim 1 in which VR server, the virtual-agent AI, the session ML, the monitoring ML, and the retry notification are implemented in a neural net.

5. The real-time process for establishing and reestablishing virtual reality (VR) sessions of claim 4 in which the neural net includes an adaptive bitrate system to improve video/audio quality and to enable transmission and receipt of multimedia.

6. The real-time process for establishing and reestablishing virtual reality (VR) sessions of claim 5 in which the neural net learns from past interactions how to apply a correct fix to create the second VR session.

7. The real-time process for establishing and reestablishing virtual reality (VR) sessions of claim 6 in which the second VR session is created dynamically based on the context.

8. The real-time process for establishing and reestablishing virtual reality (VR) sessions of claim 7 further comprising the step of: generating, by robotics in the VR server, an automatic alert if said connection interruption is detected.

9. A real-time process for establishing and reestablishing virtual reality (VR) sessions between an automated agent and a customer with customer VR equipment without losing session context after a connection loss comprising the steps of:

provide, by a VR server, a virtual agent implemented using virtual-agent artificial intelligence (AI);

creating, by the VR server in response to a customer request received from the customer VR equipment, a first VR session between the customer and the virtual agent using session machine learning (ML);

capturing, by a monitoring/rectification system using monitoring/rectification AI, an encrypted VR interaction between the customer VR equipment and the virtual agent during the first VR session;

storing, by the monitoring/rectification system in a data store, the encrypted VR interaction with a conversation tracker that maintains a ledger of the first VR session;

monitoring and processing, by the monitoring/rectification system, the encrypted interaction to identify a context for the first VR session;

storing, by the monitoring/rectification system in the data store, the context with the conversation tracker;

monitoring, by the monitoring/rectification system using said monitoring and rectification AI, the first VR session to detect any connection interruption;

if said connection interruption is detected:

generating, by the monitoring/rectification system, a retry notification;

transmitting, by the monitoring/rectification system, the retry notification to the customer VR equipment and to the VR server;

receiving, by the VR server from the customer in response to the retry notification, a reconnection request;

retrieving, by the VR server from the monitoring/rectification system, the context for the first VR session; and creating, by the VR server, a second VR session using the context from the monitoring/rectification system, so that the virtual agent and the customer may continue with the second VR session in an uninterrupted manner without loss of said context from the first VR session.

10. The real-time process for establishing and reestablishing virtual reality (VR) sessions of claim 9 in which the VR server includes a VR conversation initiator in order to create the first VR session and the second VR session.

11. The real-time process for establishing and reestablishing virtual reality (VR) sessions of claim 10 in which the VR server includes a VR processor for processing the encrypted VR interaction.

12. The real-time process for establishing and reestablishing virtual reality (VR) sessions of claim 11 in which the VR server and the monitoring/rectification system are implemented as a neural net.

13. A real-time process for establishing and reestablishing virtual reality (VR) sessions between an automated agent and a customer with customer VR equipment without losing session context after a connection loss comprising the steps of:

providing, by a VR server in a neural net, a virtual agent implemented using virtual-agent artificial intelligence (AI);

creating, by a VR conversation initiator in the VR server in response to a customer request received from the customer VR equipment, a first VR session between the customer and the virtual agent using session machine learning (ML);

capturing, by a monitoring/rectification layer in the VR server, an encrypted VR interaction between the customer VR equipment and the virtual agent during the first VR session using monitoring/rectification AI;

storing, by the monitoring/rectification layer in a data store, the encrypted VR interaction with a conversation tracker blockchain that maintains a ledger of the first VR session;

monitoring and processing, by the monitoring/rectification layer, the encrypted interaction to identify a context for the first VR session;

storing, by the monitoring/rectification layer in the data store, the context with the conversation tracker blockchain;

monitoring, by the monitoring/rectification layer using said monitoring/rectification AI, the first VR session to detect any connection interruption;

if said connection interruption is detected:

generating, by the monitoring/rectification layer, a retry notification;

transmitting, by the monitoring/rectification layer, the retry notification to the customer VR equipment and to the VR server;

receiving, by the VR server from the customer in response to the retry notification, a reconnection request;

retrieving, by the VR server from the monitoring/rectification layer, the context for the first VR session; and creating, by the VR conversation initiator in the VR server, a second VR session using the context from the monitoring/rectification layer, so that the virtual agent and the customer may continue with the second VR session in an uninterrupted manner without loss of said context from the first VR session.

* * * * *